(12) United States Patent  (10) Patent No.: US 9,835,756 B2
Morton  (45) Date of Patent: *Dec. 5, 2017

(54) DUAL MODE X-RAY VEHICLE SCANNING SYSTEM

(71) Applicant: Rapiscan Systems, Inc., Torrance, CA (US)

(72) Inventor: Edward James Morton, Guilford (GB)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,193

(22) Filed: Apr. 15, 2015

(65) Prior Publication Data

US 2016/0025891 A1   Jan. 28, 2016

Related U.S. Application Data

(63) Continuation of application No. 13/368,178, filed on Feb. 7, 2012, now Pat. No. 9,036,779, which is a
(Continued)

(30) Foreign Application Priority Data

Feb. 28, 2008 (GB) .................................. 0803642.8

(51) Int. Cl.
*G01N 23/00* (2006.01)
*G01V 5/00* (2006.01)
(Continued)

(52) U.S. Cl.
CPC ............. *G01V 5/0041* (2013.01); *G21K 1/02* (2013.01); *G21K 1/04* (2013.01)

(58) Field of Classification Search
CPC .. G01V 5/0008–5/0091; G01V 5/0041; G01V 5/0066
See application file for complete search history.

(56) References Cited

U.S. PATENT DOCUMENTS 2,831,123 A   4/1958 Daly
3,275,831 A   9/1966 Martin
(Continued)

FOREIGN PATENT DOCUMENTS

EP   0176314   4/1986
EP   0287707   10/1988
(Continued)

OTHER PUBLICATIONS

International Preliminary Report on Patentability, PCT/US2012/024182, dated Aug. 13, 2013, Rapiscan Systems Inc.
(Continued)

*Primary Examiner* — Dani Fox
(74) *Attorney, Agent, or Firm* — Novel IP

(57) ABSTRACT

A variable mode X-ray transmission system is provided that can be operated in low or high dose rate modes depending upon the area or portion of the vehicle to be screened. In one embodiment, variable dose rate is achieved by use of a novel collimator. The systems disclosed in this application enable the scanning of a vehicle cab portion (occupied by people, such as a driver) at low dose rate, which is safe for human beings, while allowing the scanning of the cargo portion (unoccupied by people) at a high dose rate. Rapid switching from low dose rate to high dose rate operating mode is provided, while striking a balance between high material penetration for cargo portion and low intensity exposure that is safe for occupants in the cab portion of the inspected vehicle.

11 Claims, 12 Drawing Sheets

Related U.S. Application Data continuation-in-part of application No. 12/919,482, filed as application No. PCT/GB2009/000515 on Feb. 26, 2009, now Pat. No. 8,971,485.

(60) Provisional application No. 61/440,835, filed on Feb. 8, 2011.

(51) Int. Cl.
G21K 1/04 (2006.01)
G21K 1/02 (2006.01)

(56) References Cited

U.S. PATENT DOCUMENTS

| | | |
|---|---|---|
| 3,766,387 A | 10/1973 | Heffan et al. |
| 3,770,955 A | 11/1973 | Tomita et al. |
| 3,784,837 A | 1/1974 | Holmstrom |
| 4,047,035 A | 9/1977 | Dennhoven et al. |
| 4,139,771 A | 2/1979 | Dennhoven et al. |
| 4,210,811 A | 7/1980 | Dennhoven et al. |
| 4,216,499 A | 8/1980 | Kunze et al. |
| 4,366,382 A | 12/1982 | Kotowski |
| 4,430,568 A | 2/1984 | Yoshida et al. |
| 4,566,113 A | 1/1986 | Donges et al. |
| 4,599,740 A | 7/1986 | Cable |
| 4,626,688 A | 12/1986 | Barnes |
| 4,641,330 A | 2/1987 | Herwig et al. |
| 4,709,382 A | 11/1987 | Sones |
| 4,736,401 A | 4/1988 | Donges et al. |
| 4,788,704 A | 11/1988 | Donges et al. |
| 4,817,123 A | 3/1989 | Sones et al. |
| 4,825,454 A | 4/1989 | Annis et al. |
| 4,872,188 A | 10/1989 | Lauro et al. |
| 4,884,289 A | 11/1989 | Glockmann et al. |
| 4,979,202 A | 12/1990 | Siczek et al. |
| 4,991,189 A | 2/1991 | Boomgaarden et al. |
| 5,022,062 A | 6/1991 | Annis |
| 5,065,418 A | 11/1991 | Bermbach et al. |
| 5,091,924 A | 2/1992 | Bermbach et al. |
| 5,098,640 A | 3/1992 | Gozani et al. |
| 5,179,581 A | 1/1993 | Annis |
| 5,181,234 A | 1/1993 | Smith |
| 5,182,764 A | 1/1993 | Peschmann et al. |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis et al. |
| 5,313,511 A | 5/1994 | Annis et al. |
| 5,367,552 A | 11/1994 | Peschmann |
| 5,379,334 A | 1/1995 | Zimmer et al. |
| 5,493,596 A | 2/1996 | Annis |
| 5,548,123 A | 8/1996 | Perez-Mendez et al. |
| 5,638,420 A | 6/1997 | Armistead |
| 5,642,393 A | 6/1997 | Krug et al. |
| 5,642,394 A | 6/1997 | Rothschild |
| 5,666,393 A | 9/1997 | Annis |
| 5,687,210 A | 11/1997 | Maitrejean et al. |
| 5,692,028 A | 11/1997 | Geus et al. |
| 5,751,837 A | 5/1998 | Watanabe et al. |
| 5,764,683 A | 6/1998 | Swift et al. |
| 5,768,334 A | 6/1998 | Maitrejean et al. |
| 5,787,145 A | 7/1998 | Geus |
| 5,805,660 A | 9/1998 | Perion et al. |
| 5,838,759 A | 11/1998 | Armistead |
| 5,903,623 A | 5/1999 | Swift et al. |
| 5,910,973 A | 6/1999 | Grodzins |
| 5,930,326 A | 7/1999 | Rothschild et al. |
| 5,940,468 A | 8/1999 | Huang et al. |
| 5,974,111 A | 10/1999 | Krug et al. |
| 6,031,890 A | 2/2000 | Bermbach et al. |
| 6,058,158 A | 5/2000 | Eiler |
| 6,067,344 A | 5/2000 | Grodzins et al. |
| 6,081,580 A | 6/2000 | Grodzins et al. |
| 6,094,472 A | 7/2000 | Smith |
| 6,151,381 A | 11/2000 | Grodzins et al. |
| 6,188,747 B1 | 2/2001 | Geus et al. |
| 6,192,101 B1 | 2/2001 | Grodzins |
| 6,192,104 B1 | 2/2001 | Adams et al. |
| 6,195,413 B1 | 2/2001 | Geus et al. |
| 6,198,795 B1 | 3/2001 | Naumann et al. |
| 6,218,943 B1 | 4/2001 | Ellenbogen |
| 6,249,567 B1 | 6/2001 | Rothschild et al. |
| 6,252,929 B1 | 6/2001 | Swift et al. |
| 6,256,369 B1 | 7/2001 | Lai |
| 6,278,115 B1 | 8/2001 | Annis et al. |
| 6,282,260 B1 | 8/2001 | Grodzins |
| 6,292,533 B1 | 9/2001 | Swift et al. |
| 6,301,326 B2 | 10/2001 | Bjorkholm |
| 6,320,933 B1 | 11/2001 | Grodzins et al. |
| 6,356,620 B1 | 3/2002 | Rothschild et al. |
| 6,424,695 B1 | 7/2002 | Grodzins et al. |
| 6,434,219 B1 | 8/2002 | Rothschild et al. |
| 6,435,715 B1 | 8/2002 | Betz et al. |
| 6,442,233 B1 | 8/2002 | Grodzins et al. |
| 6,445,765 B1 | 9/2002 | Frank et al. |
| 6,453,003 B1 | 9/2002 | Springer et al. |
| 6,453,007 B2 | 9/2002 | Adams et al. |
| 6,456,684 B1 | 9/2002 | Mun et al. |
| 6,459,761 B1 | 10/2002 | Grodzins et al. |
| 6,459,764 B1 | 10/2002 | Chalmers et al. |
| 6,473,487 B1 | 10/2002 | Le |
| RE37,899 E | 11/2002 | Grodzins et al. |
| 6,483,894 B2 | 11/2002 | Hartick et al. |
| 6,507,025 B1 | 1/2003 | Verbinski et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,580 B1 | 4/2003 | Carver et al. |
| 6,546,072 B1 | 4/2003 | Chalmers |
| 6,552,346 B2 | 4/2003 | Verbinski et al. |
| 6,563,903 B2 | 5/2003 | Kang et al. |
| 6,580,778 B2 | 6/2003 | Meder |
| 6,584,170 B2 | 6/2003 | Aust et al. |
| 6,597,760 B2 | 7/2003 | Beneke et al. |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers et al. |
| 6,663,280 B2 | 12/2003 | Doenges |
| 6,665,373 B1 | 12/2003 | Kotowski et al. |
| 6,665,433 B2 | 12/2003 | Roder |
| 6,763,635 B1 | 7/2004 | Lowman |
| 6,785,357 B2 | 8/2004 | Bernardi et al. |
| 6,812,426 B1 | 11/2004 | Kotowski et al. |
| 6,816,571 B2 | 11/2004 | Bijjani et al. |
| 6,837,422 B1 | 1/2005 | Meder |
| 6,839,403 B1 | 1/2005 | Kotowski et al. |
| 6,843,599 B2 | 1/2005 | Le et al. |
| 6,920,197 B2 | 7/2005 | Kang et al. |
| 6,928,141 B2 | 8/2005 | Carver et al. |
| 7,039,159 B2 | 5/2006 | Muenchau et al. |
| 7,046,768 B1 | 5/2006 | Gilevich |
| 7,099,434 B2 | 8/2006 | Adams et al. |
| 7,166,844 B1 | 1/2007 | Gormley et al. |
| 7,207,713 B2 | 4/2007 | Lowman |
| 7,215,738 B2 | 5/2007 | Muenchau et al. |
| 7,352,843 B2 | 4/2008 | Hu et al. |
| 7,483,510 B2 | 1/2009 | Carver et al. |
| 7,483,511 B2 | 1/2009 | Bendahan et al. |
| 7,505,556 B2 | 3/2009 | Chalmers et al. |
| 7,505,557 B2 | 3/2009 | Modica et al. |
| 7,532,844 B2 | 5/2009 | Tanaka |
| 7,738,687 B2 | 6/2010 | Tortora et al. |
| 7,742,568 B2 | 6/2010 | Smith |
| 7,991,117 B2 | 8/2011 | Chen et al. |
| 8,031,903 B2 | 10/2011 | Paresi et al. |
| 8,263,938 B2 | 9/2012 | Bjorkholm |
| 8,502,699 B2 | 8/2013 | Zerwekh et al. |
| 2005/0117683 A1 | 6/2005 | Mishin et al. |
| 2005/0117700 A1 | 6/2005 | Peschmann |
| 2006/0140341 A1 | 6/2006 | Carver et al. |
| 2007/0280416 A1 | 12/2007 | Bendahan et al. |
| 2009/0316851 A1 | 12/2009 | Oosaka et al. |

(56) References Cited

U.S. PATENT DOCUMENTS

| | | |
|---|---|---|
| 2010/0177873 A1 | 7/2010 | Chen et al. |
| 2011/0176660 A1 | 7/2011 | Morton |
| 2011/0274242 A1 | 11/2011 | Linev |

FOREIGN PATENT DOCUMENTS

| | | |
|---|---|---|
| WO | 2006036076 A1 | 4/2006 |
| WO | 2006045019 | 4/2006 |
| WO | 2006078691 A2 | 7/2006 |
| WO | 2007051092 | 5/2007 |
| WO | 2009106815 | 9/2009 |

OTHER PUBLICATIONS

International Search Report, PCT/US2012/024182 dated Aug. 20, 2012, Rapiscan Systems Inc.
Notice of Allowance dated Jan. 21, 2015 for U.S. Appl. No. 13/368,178.
Corrected Notice of Allowance dated Mar. 19, 2015 for U.S. Appl. No. 13/368,178.
Examination Report for Great Britain Patent Application No. GB1315294.7, dated Mar. 7, 2016.
Examination Report for Great Britain Patent Application No. GB1315294.7, dated Jul. 25, 2016.
Extended European Search Report for Application No. 12741739.2, dated Mar. 27, 2017.

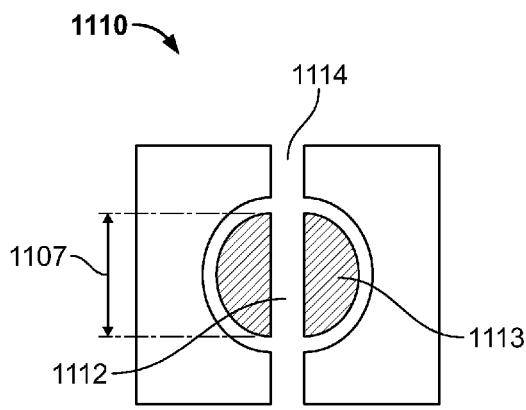
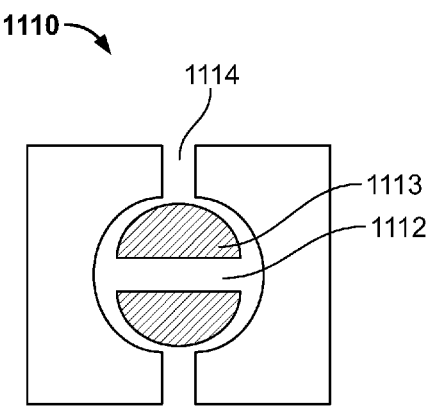
FIG. 11A          FIG. 11B
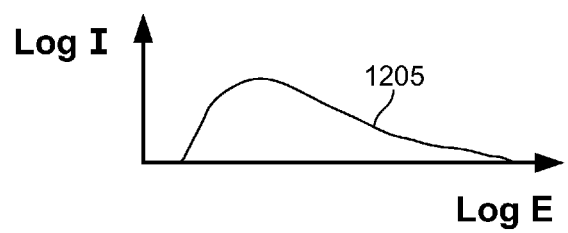
FIG. 12A
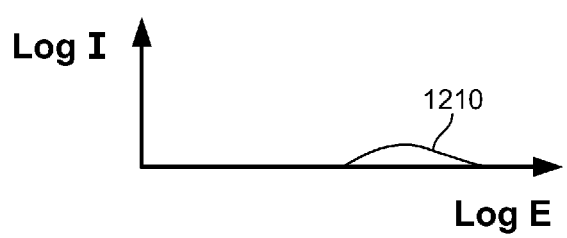
FIG. 12B

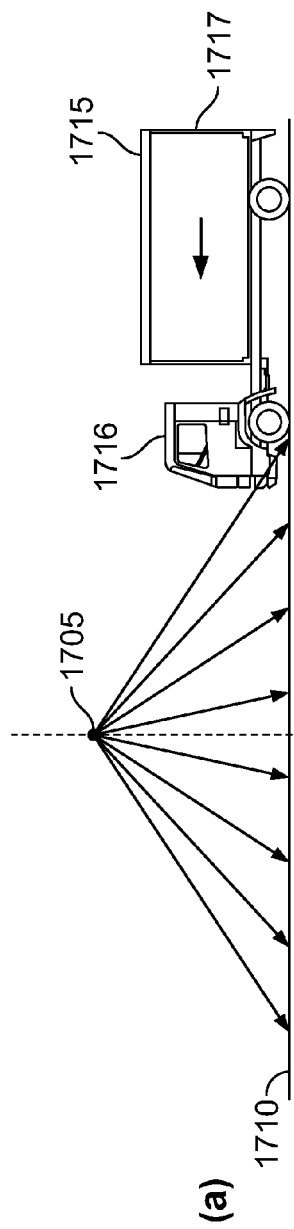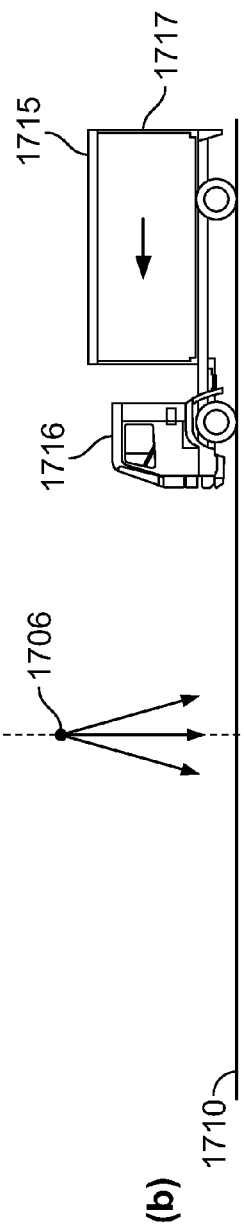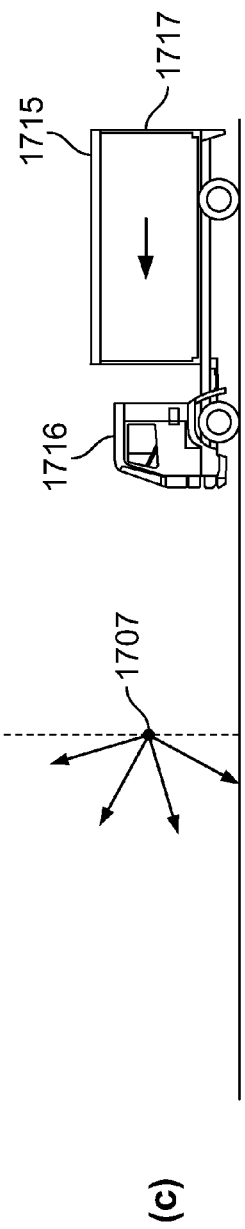

DUAL MODE X-RAY VEHICLE SCANNING SYSTEM

CROSS-REFERENCE

The present application is a continuation application of U.S. patent application Ser. No. 13/368,178, entitled "Dual Mode X-Ray Vehicle Scanning System" and filed on Feb. 7, 2012, which is a continuation-in-part application of U.S. application Ser. No. 12/919,482, entitled "Drive-Through Scanning Systems", filed on Aug. 26, 2010, and issued on Mar. 3, 2015 as U.S. Pat. No. 8,971,485, which is a National Stage Entry of PCT Application Number PCT/GB2009/000515, of the same title and filed on Feb. 26, 2009, which further relies on Great Britain Patent Application Number 0803642.8, filed on Feb. 28, 2008, for priority, all of which are herein incorporated by reference in their entirety.

U.S. patent application Ser. No. 13/368,178 also relies on U.S. Provisional Patent Application No. 61/440,835, entitled "Dual Mode X-Ray Vehicle Scanning System" and filed on Feb. 8, 2011, for priority, which is also herein incorporated by reference in its entirety.

FIELD

This application relates generally to security systems for screening threats and contraband contained on vehicles, and more specifically, to a dual mode X-ray transmission system that can be operated in low or high dose rate modes depending upon the area or portion of the vehicle to be screened by use of a novel collimator.

BACKGROUND

There exists an acute need for screening of cargo and vehicles for detection of threat materials and illegal trade. Typically, such screening is conducted by using X-ray imaging systems in transmission mode, wherein the vehicle to be inspected is driven into an imaging facility, the driver exits the vehicle, and the X-ray scan is conducted at relatively high doses.

Scanning systems are also known in which the driver remains in the vehicle during the scan. Here, the driver drives through the X-ray system and the high energy X-ray beam is only turned on after the driver and the cab of the vehicle have passed through the inspection zone so that only the cargo is inspected. X-ray installations of this type are commonly known as portal systems.

However, the aforementioned prior art inspection systems are disadvantageous in that the cab of the vehicle is not inspected at all, thus causing a serious security gap and a potential breach in security.

Dual source approaches have also been known wherein a low-dose, low-energy X-ray source is used to scan the cab and driver when they are in the inspection zone while a high energy source is switched on when the cab has passed and the cargo is in the inspection zone. This approach works well in situations where the high energy X-ray source is in the range 2 MV and above. In lower energy systems (in the range 1 MV to 3 MV), this dual source approach can be too expensive to allow practical implementation.

Therefore, there is a need for an X-ray transmission vehicle inspection system that enables scanning of the cab portion (occupied by people, such as a driver) at low dose rate safe for human beings while allowing scanning of the cargo portion (unoccupied by people) at high dose rate. There is also a need for an X-ray cargo inspection system that can rapidly switch from low dose rate to high dose rate operating mode while striking a balance between high materials penetration for cargo portion and low intensity exposure which is safe for occupants in the cab portion of the inspected vehicle. Preferably, the vehicle inspection system allows scanning cars, buses, or other passenger vehicles in only a low dose rate mode and can be operated in dual mode when required to scan cargo vehicles that have cab and cargo container portions.

SUMMARY

It is an object of the present application to provide a security system for screening threats and contraband contained on vehicles, and more specifically, a variable mode X-ray transmission system that can be operated in low or high dose rate modes depending upon the area or portion of the vehicle to be screened.

In one embodiment, the present application is directed towards an X-ray inspection system with variable energy dose rate for screening vehicles comprising an X-ray source for generating an X-ray beam, at least one detector array to receive the X-ray beam signals transmitted through the inspected vehicle, and a collimator that modulates the intensity of X-ray beam to produce low or high X-ray energy dose rate depending upon the portion of the vehicle being screened.

In one embodiment, the dose rate varies such that the portion of the vehicle carrying people receives an acceptable lower energy dosage as compared to the portion of the vehicle carrying cargo.

Optionally, the X-ray inspection system further comprises plurality of sensors to determine which portion of the vehicle is passing through the scanning region.

In one embodiment, the collimator comprises an insert located within an opening defined by a first block and a second block, wherein said insert is rotated to vary the delivered dose rate.

Optionally, the X-ray inspection system further comprises an electrical control system for rotating said collimator insert at the appropriate time based on input from a plurality of sensors.

Optionally, the variation in dose rate is proportional to the rotation angle of the collimator insert. Further optionally, the collimator insert is rotated by a fixed angle to achieve a defined variation in dose rate. In one embodiment, the fixed and defined incremental rotation is achieved using the Geneva mechanism.

Optionally, the low dose rate is in the range of 10% to 0.1% of the full source dose rate, and the rotation of the insert to attenuate the beam produces the effect of beam hardening.

In one embodiment, the sensors in the X-ray inspection system comprise a combination of three scanning laser sensor systems to track the inspected vehicle.

Optionally, the entire vehicle is scanned at low dose rate if no cargo is detected.

In one embodiment, the X-ray inspection system is implemented in a fixed portal configuration. In one embodiment, the X-ray inspection system is implemented as a mobile drive-through portal system.

In another embodiment, the present application discloses an X-ray inspection system, having a scanning region defined therein and a variable energy dose rate for screening a vehicle, the system comprising an X-ray source for generating an X-ray beam and a collimator having a moveable component, wherein said moveable component is adapted to switch between a first position and a second position, wherein, when said moveable component is in the first position, the X-ray source and collimator emit a high energy X-ray dose, wherein, when said moveable component is in the second position, the X-ray source and collimator emit a low energy X-ray dose, and wherein said switching is achieved in less than 0.5 seconds. Optionally, a timing of said switching is determined by what portion of the vehicle is being exposed to said scanning region. Optionally, the collimator comprises a first portion and a second portion and the moveable component is an insert located within an opening defined by said first portion and said second portion. Optionally, the moveable component is rotated to switch between said low energy and high energy dose rates. Optionally, the low energy X-ray dose rate is in the range of 10% to 0.1% of the high energy X-ray dose rate.

BRIEF DESCRIPTION OF THE DRAWINGS

These and other features and advantages of the present invention will be appreciated, as they become better understood by reference to the following detailed description when considered in connection with the accompanying drawings, wherein:

FIG. 11a is a diagram illustrating the collimator in the present specification operating in a high dose rate mode;

FIG. 11b shows the collimator of FIG. 11a operating in a low dose rate mode;

FIG. 12a is a graph showing an X-ray spectrum typically emitted from an X-ray linear accelerator with equivalent operating energy of 1 MV;

FIG. 12b is a graph showing a filtered spectrum having a mean higher energy with lower intensity;

FIG. 17a shows a scanning laser range finder inclined at an angle planar to the surface of the road;

FIG. 17b shows a scanning laser oriented perpendicular to the direction of motion of the inspected vehicle in a vertical plane perpendicular to the road surface; and FIG. 17c shows a scanning laser oriented in a vertical plane projecting towards the side of the inspected vehicle.

DETAILED DESCRIPTION

The present specification recognizes that it is advantageous if a cargo item carried on a vehicle can be driven through a stationary X-ray inspection system by the driver of the vehicle. However, it is also recognized that when imaging using a high energy X-ray source, the dose that would be accumulated by the driver during this scanning process would be at an unacceptable level in most commercial operating environments.

A typical dose rate output from a linear accelerator is in the range 10 to 50 Gy/hr at 1 m. For a scan rate of 0.25 m/s, the dose delivered to a driver at 3 m from the X-ray source can be calculated to be in the range 300 to 1500 μSv. This dose per scan is not generally acceptable.

The present application discloses multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
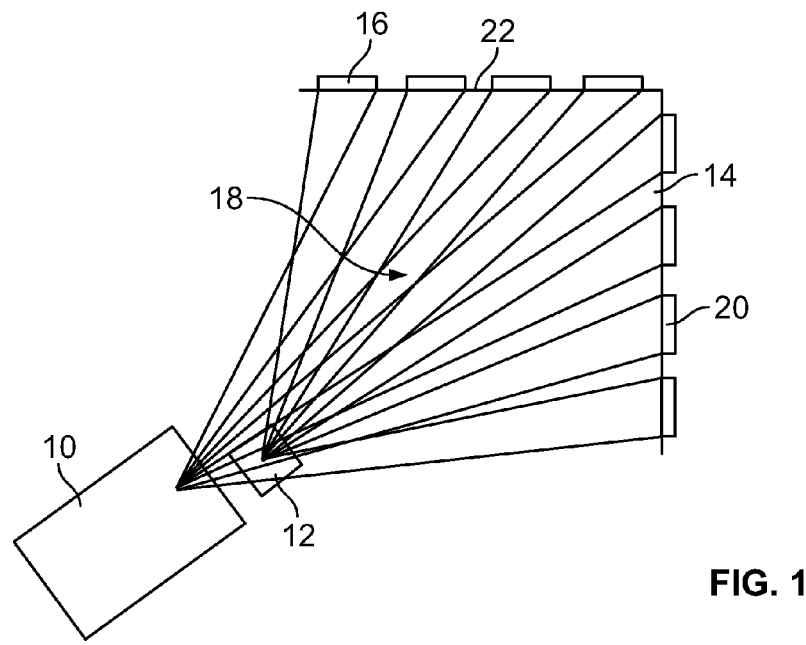
FIG. 1 is a schematic view of a scanning system according to an embodiment of the invention.

Referring to FIG. 1, in one embodiment of the present invention, a scanning system comprises a high energy X-ray source 10 in the form of a linear accelerator, and a low energy X-ray source 12. The low energy X-ray source 12 can be a stationary or rotating anode X-ray tube operating at a high voltage potential of 60 kVp to 450 kVp. Typically, a tube voltage of 160 kVp provides a good balance between radiation dose, image quality, system reliability and system cost. The high energy X-ray source may comprise stationary anode X-ray tubes. The anode is typically operated at or near ground potential and the cathode is typically operated at negative potential. The anode is then cooled with oil, water or other suitable coolant. In low power X-ray tubes of the low energy source 12, the anode is typically operated at high positive potential and the cathode is typically operate at high negative potential and no direct anode cooling is provided.

A detector system 14 comprises a plurality of detectors 16 arranged to detect X-rays from both of the sources 10, 12. The detectors 16 are arranged around a scanning volume 18, in a vertical array 20 which extends down one side of the scanning volume 18, on the opposite side of it to the sources 10, 12, and horizontal array 22 which extends over the top of the scanning volume. The sources 10, 12 are located close to each other and both in the same plane as the detector arrays. Each of the sources 10, 12 is arranged to generate X-rays in a fan beam in the common plane. The dose rate at the output of a low voltage X-ray generator 12 is substantially less than that from a linear accelerator 10. For example, the dose rate from a standard X-ray source operating at 160 kVp with a 1 mA beam current is typically around 0.3 Gy/hr at 1 m. For a scan rate of 0.25 m/s, the dose delivered to a driver at 3 m from the X-ray source can be calculated to be around 10 µSv per scan.

In one practical embodiment of this invention, the scan of a vehicle including a driver's cab and a cargo container is started using the low energy X-ray source 12 only. As the vehicle is driven through the scanning volume, image data is collected as the driver's cab passes through the X-ray beam. Once the driver's cab has passed through the beam, the high energy X-ray linear accelerator 10 is switched on and the low energy X-ray source 12 is turned off. The main cargo load would be inspected with the full intensity high voltage X-ray beam from the linear accelerator 10 to provide a high level of inspection.

In this hybrid imaging system, the driver will normally be sitting within the cab of a vehicle, and this cab will afford the driver some additional protection which will drop the driver dose further still.

An X-ray beam at 160 kVp beam quality will be able to penetrate through the driver and 10-20 mm of steel so providing inspection capability of many parts of the drivers cab including the tyres, door panels and roof although little inspection capability would be provided in the main engine compartment.

The detector elements in the detectors 16 in a cargo screening system will typically be tuned such that their full scale matches the peak intensity that can be delivered from the X-ray linear accelerator 10. This detector elements are further designed to achieve a dynamic range on the order of 100,000 (i.e. a noise level of around 10 parts per million of full scale range).

With no object present in the beam, the output from the conventional X-ray generator 12 will be equivalent to approximately 0.05% to 0.3% of full scale depending on how the detectors 16 are tuned. After attenuation by the driver and 10 mm of steel, the signal, i.e. X-ray intensity, at the detector 16 is expected to drop by a further factor of 1000. This gives a signal at the detector of 1/20,000 of full scale which is still within the reasonable dynamic range of the detector 16.

Figure 2:
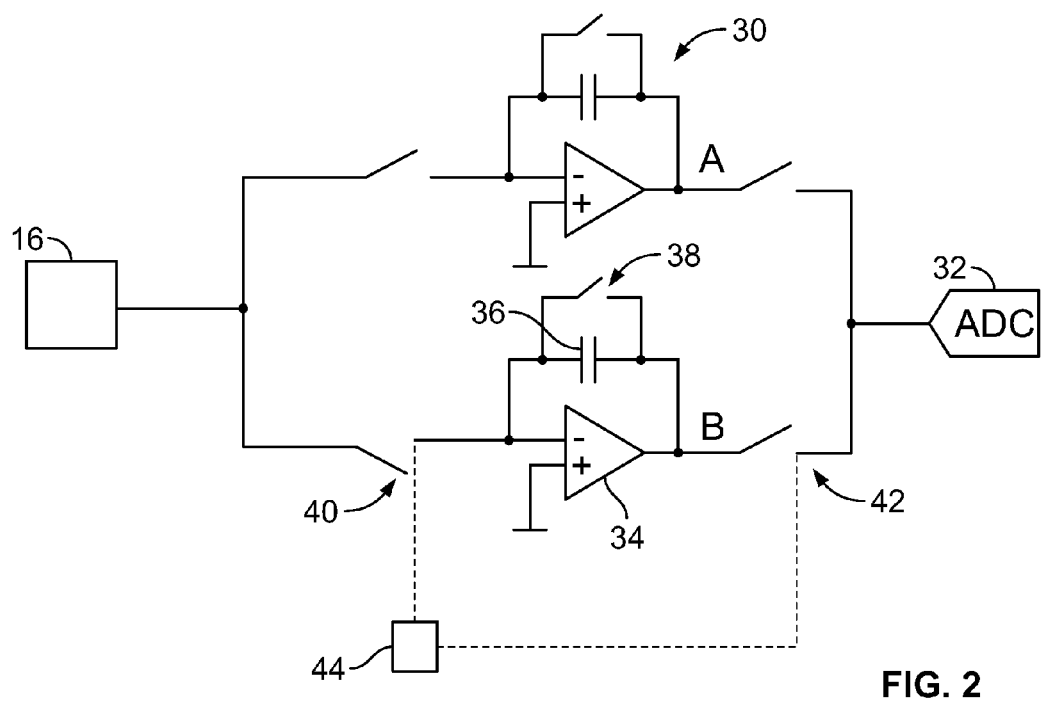
FIG. 2 is a diagram of the data acquisition circuit of a detector used within the system of FIG. 1.

Referring to FIG. 2, the scanning system further comprises a data acquisition system that is capable of acquiring and merging the two sets of X-ray image data from the detectors 16, generated by X-rays from the two sources 10, 12 respectively. With reference to FIG. 2, for each detector 16, a preamplifier/integrator circuit 30 is provided with two independent integrator circuits; side A and side B, connected in parallel between the sensor 16 and an analogue-to-digital converter (ADC) 32. Each integrator feeds into the shared ADC 32 through a simple multiplexor.

Each preamplifier/integrator circuit 30 comprises an amplifier 34 in parallel with a capacitor 36 and a re-set switch 38. The input to the amplifier is connected to the sensor 16 by an integrate switch 40 and the output from the amplifier is connected to the ADC by a digitize switch 42. Each of the switches can be closed by a control signal from a controller 44. Closing the integrate switch starts the circuit integrating the signal from the sensor, increasing the charge on the capacitor 36, and opening it stops the integration. Closing the digitizing switch connects the capacitor 38 to the ADC which converts the stored voltage to a digital output signal. The capacitor can then be discharged by closing the re-set switch 38 before the next integration.

Figure 3:
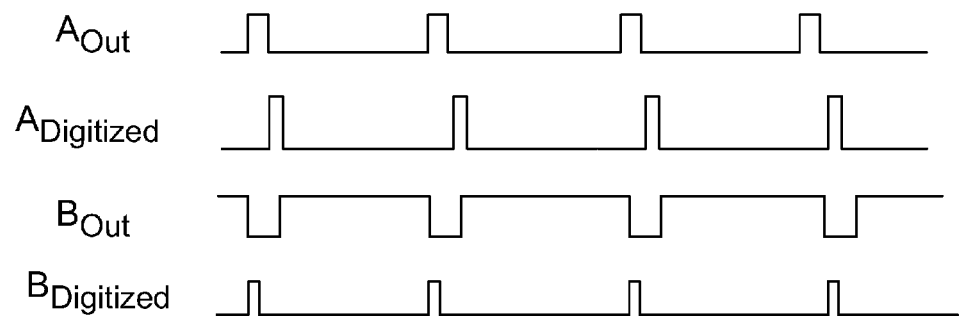
FIG. 3 is a timing diagram showing operation of the circuit of FIG. 2.

As shown in FIG. 3, the integration time on side A, when the control signal $A_{int}$ from the controller 40 is high, is short, while the integration time on side B, when the control signal $B_{int}$ from the controller 40 is high, is long. In each case the integration time corresponds with the time that the appropriate source 10, 12 is turned on, also under control of the controller 40, the source being turned on at the beginning of the associated integration time and turned off at the end of the associated integration time. The sources 10, 12 are therefore turned on alternately. As can be seen from FIG. 3, this means that the low energy source 10 is turned on for relatively long periods, and turned off for shorter periods, and the high energy source 10 is only turned on for the short periods while the low energy source is off. The cycle time is typically on the order of 10 ms with an A side integration time typically of 10 µs and a B side integration time of 9.990 ms. In each case, the digitizing switch 42 is closed, by a short pulse in the appropriate control signal $A_{digitize}$ or $B_{digitize}$ from the controller 40, to digitize the integrated signal at the end of the integration time over which integration has taken place.

When imaging with the low energy X-ray source 12, the primary signal is read out using the B side digitised data. When imaging with the linear accelerator source 10, the primary signal is read out using the A side digitised data. It will be appreciated that the timing described above allows the two sources to be used alternately to form alternate two-dimensional image slices, or one of the sources to be turned off so that just one of the sources is used to generate a series of two-dimensional image slices.

In one mode of operation of this embodiment of this invention, when imaging with the high energy X-ray source 10, the low energy X-ray generator 12 is turned off. However the B-side digitised data is used to collect pulse-by-pulse dark offset data which is time and position correlated with the image data from A side and subtracted as dark noise from the imaging signal to provide correction of the imaging signal to correct for the dark noise.

Figure 4A:
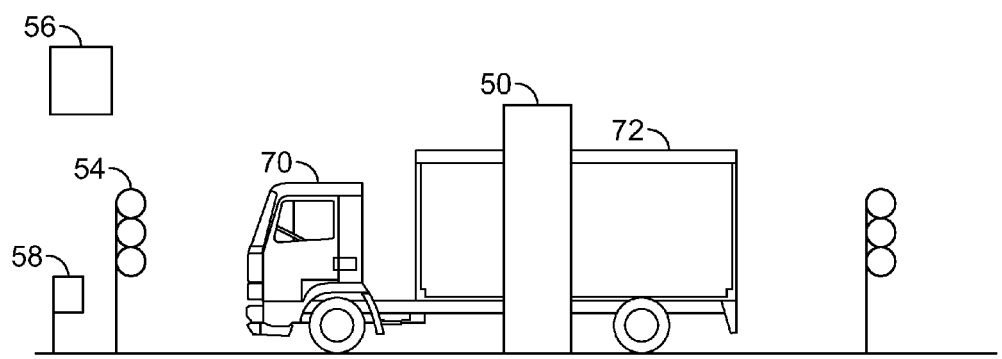
FIG. 4a is a schematic view of the system of FIG. 1 in use.
Figure 4B:
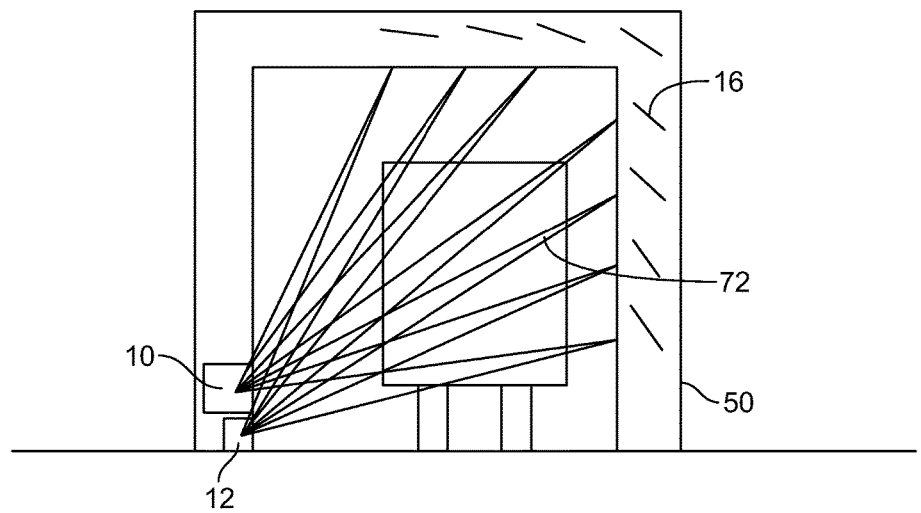
FIG. 4b is a schematic view of the system of FIG. 1 in use.
Figure 6:
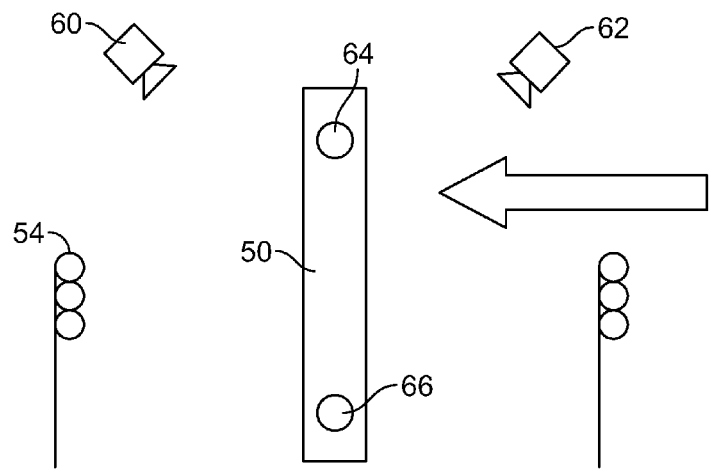
FIG. 6 is a schematic plan view of the system of FIG. 1.

Referring to FIG. 4, the X-ray sources 16 and multi-element detector arrays 20, 22 are located within a fixed housing 50 which is firmly attached to the ground and forms an arch over the scanning volume. The system further comprises a traffic control system which includes a signalling system 52, including traffic lights 54, and a signal display 56, arranged to provide signals to the driver of the vehicle to regulate the speed and/or timing of driving the vehicle through the scanner. The traffic control system further comprises one or more speed detectors, in this case a radar gun 58, arranged to measure the speed of the vehicle. Referring to FIG. 6, the traffic control system further comprises a first camera 60 on one side of the scanner and a second camera 62 on the other side of the scanner. As shown in FIG. 4a, the driver drives the vehicle including the truck 70 and cargo load 72 through the detection system, following speed indications that are provided via the traffic light system. As shown in FIG. 4b, the truck 70 and cargo load 72 pass through the X-ray beam between the X-ray sources 10, 12 and the detector arrays 20, 22.

Figure 5:
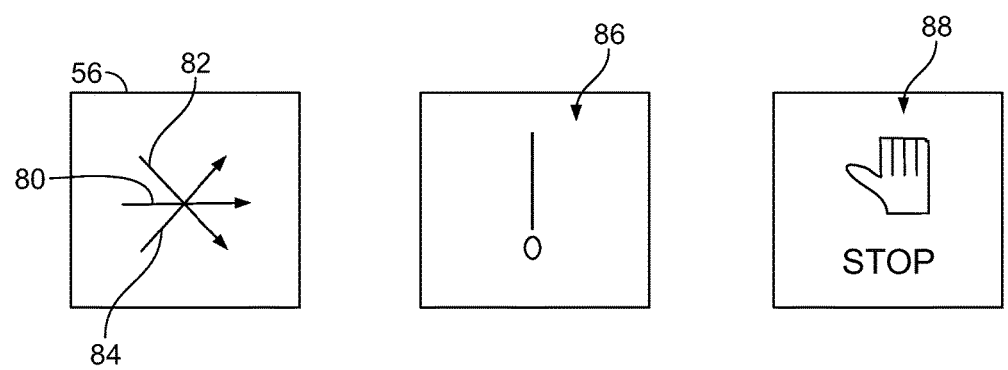
FIG. 5 shows a number of driver instruction signals used in the system of FIG. 1.

To maintain a high quality image, it is preferable that the velocity of the object, in this case the vehicle, under inspection should remain substantially constant throughout the whole of the scanning of the object. The traffic control system is provided for this purpose. The radar speed gun 58 is arranged to continuously monitor the speed of the vehicle, including the load 72 and to feed back to a control unit which controls the visual display 56, mounted by the roadside, which advantageously can be arranged to provide a number of display signals as shown in FIG. 5. At the left hand side of FIG. 5, a horizontal arrow 80 is lit in a green colour when the driver is at the optimal speed, i.e. within a predetermined speed range. When the truck is travelling too fast, a downwards pointing orange coloured arrow 82 will be displayed. Conversely, when the load is travelling too slowly, an upwards pointing arrow 84 will be displayed. If the velocity of the load becomes too low for the scan to continue, or if the load stops, a red '!' sign 86 will be displayed and the scan will be terminated (see middle graphic of FIG. 5). When the load is going much too fast, a red "hand" sign 88 will be displayed and the scan will be terminated (see right hand graphic in FIG. 5). Other traffic control systems can be used, for example giving numerical displays of desired vehicle speeds, The traffic lights 54 (with Red, Amber and Green indicators) are arranged to control the movement of each vehicle to be inspected through the scanner. The use of such traffic control measures substantially reduces the human effort required to co-ordinate scanning of cargo loads. This is advantageous in reducing cost of operation as well as in reducing employee radiation dose exposure.

In a further aspect of this invention, it is necessary to control the imaging system in order to control which one of the two X-ray sources 10, 12 should be switched on at all times during a scan of a vehicle and between scans of different vehicles. To facilitate this process, a small number of video cameras 60, 62 is installed around the X-ray installation, typically as shown in FIG. 6. One camera 60 views the front of the vehicle as it approaches the scanner. Another camera 62 views the rear of the vehicle as it exits from the scanner. A third camera 64 views down between the vertical detector array 20 and the side of the load furthest from the X-ray sources 10, 12. A fourth camera 66 views down between the side of the load closest to the X-ray sources 10, 12 and the vertical supporting structure 50.

Prior to the vehicle entering the image inspection area, all X-ray sources 10, 12 are normally be switched off. As the vehicle enters the image inspection area, the vertical viewing cameras 64, 66 are used to monitor the exact position of the vehicle and to control turn on of the low energy X-ray beam when the front of the vehicle is around 10 cm from the vertical imaging plane. It is prudent to utilise one or more secondary sensors, such as an infra-red light beam to validate the position of the vehicle with respect to the imaging plane. The vertical viewing cameras 64, 66 continue to monitor the position of the vehicle as it moves through the scanning plane, seeking to determine when the trailing edge of the driver's cab 70 has passed through the X-ray beam. Once this feature has been detected, the X-ray linear accelerator source 10 is prepared for operation, but no pulses will be allowed to be generated by that source until such time as the video cameras 60, 62, 64, 66, have detected that the leading edge of the cargo load 72 has entered the imaging plane. At this point, the X-ray linear accelerator is activated to generate a high energy X-ray beam and the low energy X-ray source 12 is turned off. The scan can now proceed until cameras 62, 64, and 66 all verify that the cargo load 72 has exited the imaging plane. At this point both X-ray sources 10, 12 are turned off.

Figure 7:
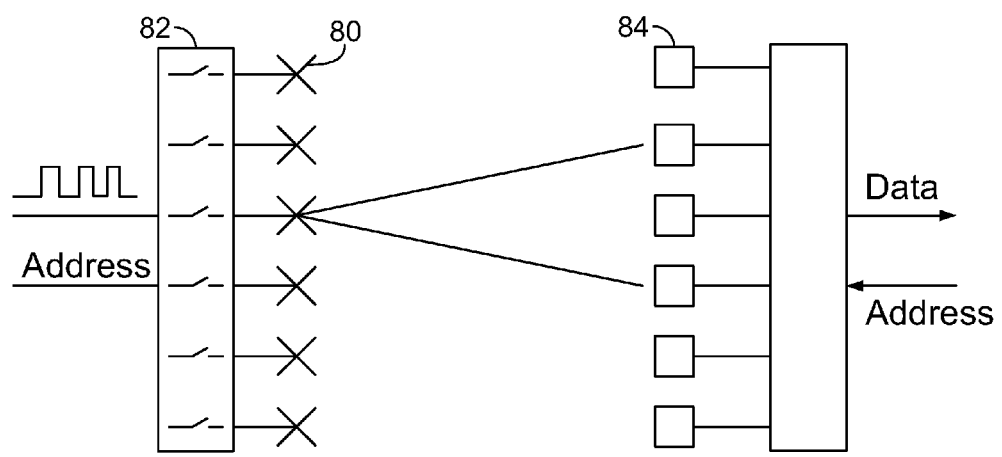
FIG. 7 is a schematic view of an infra-red sensor system of a further embodiment of the invention.

As a secondary safety feature, an infra-red light curtain is provided to illuminate a plane close to, and parallel to, the imaging plane to establish the presence of the vehicle, and determine the vertical profile of the part of the vehicle that is within the imaging plane so as to help determine which part of the vehicle is in the imaging plane. Referring to FIG. 7, in this embodiment, a series of light sources in the form of infra-red light emitting diodes 80 are arranged in a vertical linear array. A control circuit 82 is connected to each LED 80 and comprises a set of addressable switches each connected to a respective one of the LEDs 80. The control circuit 82 is arranged to address each light source 80 in turn to turn it on, and the activated light source is pulsed by a clock pulse at a frequency of typically 10 kHz. Each light source is turned on for typically 1 ms at a time. In an array with 20 light sources, it is then possible to scan the system every 20 ms, or equivalently at a 50 Hz repetition rate.

Figure 8:
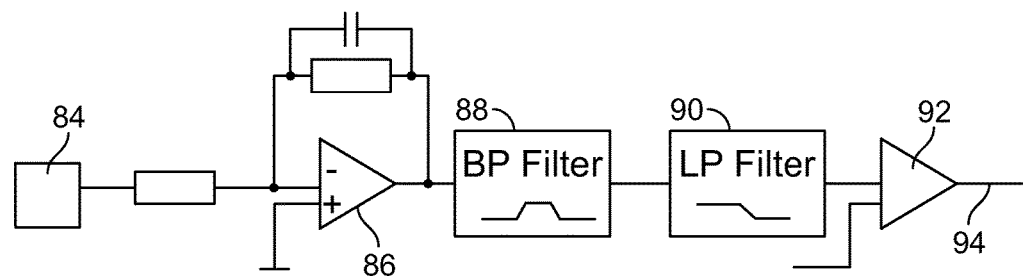
FIG. 8 is a diagram of the detector circuit associated with each of the sensors of the sensor system of FIG. 7.

A series of infra-red sensitive photodiodes 84 are arranged into a vertical linear array on the opposite side of the path of the vehicle to the LEDs, each with their own high speed amplifier. As shown in FIG. 8, the output of each amplifier 86 is passed through a band-pass filter 88 that is tuned to the excitation frequency of the associated light emitting diodes 80, for example 10 kHz. The output from this filter 88 is a switching potential which can be passed into a low pass filter 90 (with a bandwidth of around 1 kHz) which acts to integrate the high frequency switching signal. The output of the low pass filter 90 is then input into a comparator 92 to compare it with a fixed threshold to give a simple binary decision as to whether the receiver 84 is illuminated or not. This binary value for all of the detectors 84 is multiplexed out to a single data line 94 for onwards processing.

The use of a high frequency switching signal with subsequent a.c. coupling is designed to provide good noise rejection independent of ambient temperature for this safety critical signal.

Figure 9:
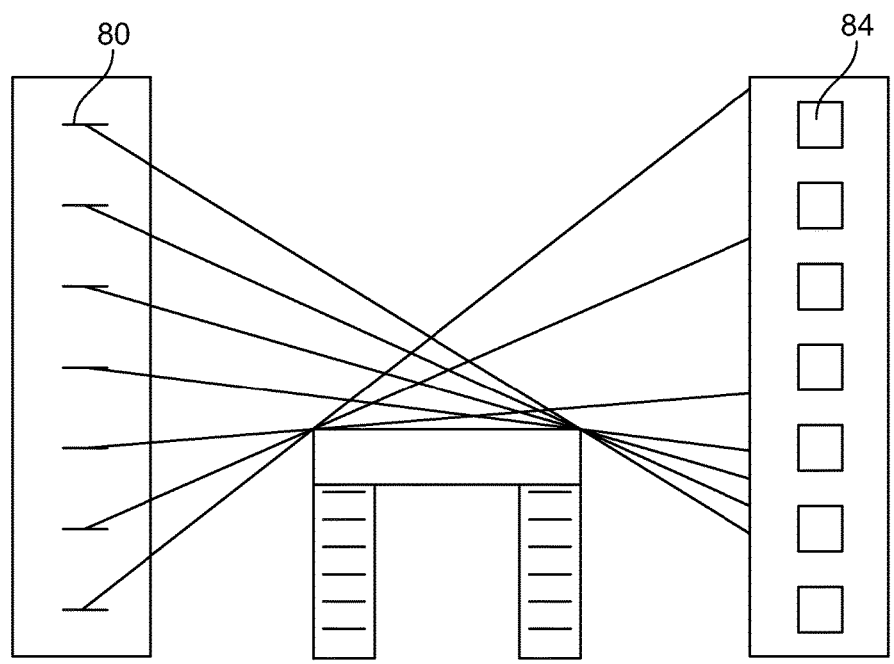
FIG. 9 is a schematic front view of the sensor system of FIG. 7 in operation.

Each emitting light emitting diode 80 is arranged to generate a fan beam of infra-red radiation in a vertical plane so that it will illuminate multiple receivers 84. It is possible to determine the height, and to some extent the profile, of any object in the plane of the beam as shown in FIG. 9 by determining the lowest illuminated light receiver 84 during activation of each of the light sources 80 in turn.

The data on the output 94 from the light curtain is input to the processor 44 by means of which it is processed and coupled with that from the video data in order to establish when the trailing edge of the cab 70 has passed through the inspection plane and the leading edge of the load 72 has arrived.

It will be appreciated that, as well as IR radiation, other wavelengths of electromagnetic radiation, for example visible light, could be used in the light curtain.

In a further modification to this embodiment of the invention, the X-ray data itself is analysed by the controller 44 and interpreted as it is collected on a pulse by pulse basis to determine when the trailing edge of the drivers cab 70 has passed through the scanner and when the leading edge of the cargo load 72 enters the imaging plane of the scanner. In this modification there are now three types of information that indicate independently, and should all correlate to confirm, the passing of the trailing end of the driver's cab 70 and the start of the cargo load 72: (1) video data, (2) infra-red light curtain data, and (3) X-ray image data. These redundant signals are sufficient to build a safety case for the operation of a driver controlled cargo inspection system.

In a practical embodiment of this system, it is likely that non-cargo loads may be inadvertently passed through the inspection system. For example, a bus or coach carrying passengers may be selected for screening. In this case, no high energy X-ray screening should be performed to minimise dose to the passengers. It can be seen that in this case the three-way redundant data analysis system should not pick up the trailing edge of the drivers cab (since there is not one present), and neither should it pick up the start of the cargo load (since there is not one of these either). This means that the high energy X-ray system will not be turned on, but the load will still have been inspected to a reasonable degree using the low energy source.

In yet another embodiment, the present application discloses a security system for screening threats and contraband contained on vehicles, and more specifically, a variable mode X-ray transmission system that can be operated in low or high dose rate modes depending upon the area or portion of the vehicle to be screened. In one embodiment, the systems disclosed herein achieve variable mode operation of the X-ray transmission system by use of a novel collimator. The X-ray transmission vehicle inspection system enables the scanning of the cab portion (occupied by people, such as a driver) at low dose rate safe for human beings while allowing scanning of the cargo portion (unoccupied by people) at high dose rate. Further, rapid switching from low dose rate to high dose rate operating mode is provided, while striking a balance between high materials penetration for cargo portion and low intensity exposure safe for occupants in the cab portion of the inspected vehicle.

Figure 10A:
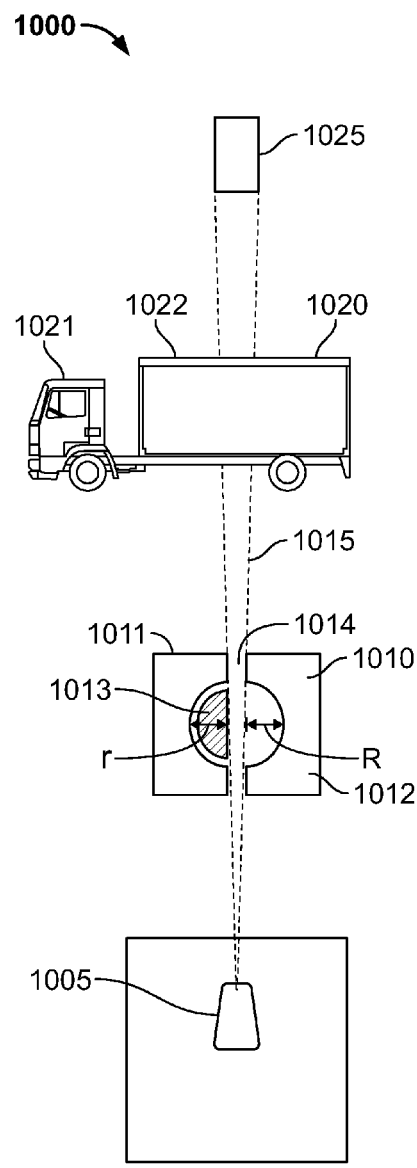
FIG. 10a is a block diagram illustrating one embodiment of the X-ray transmission vehicle screening system of the present specification, having a collimator operating in a high dose rate mode.
Figure 10B:
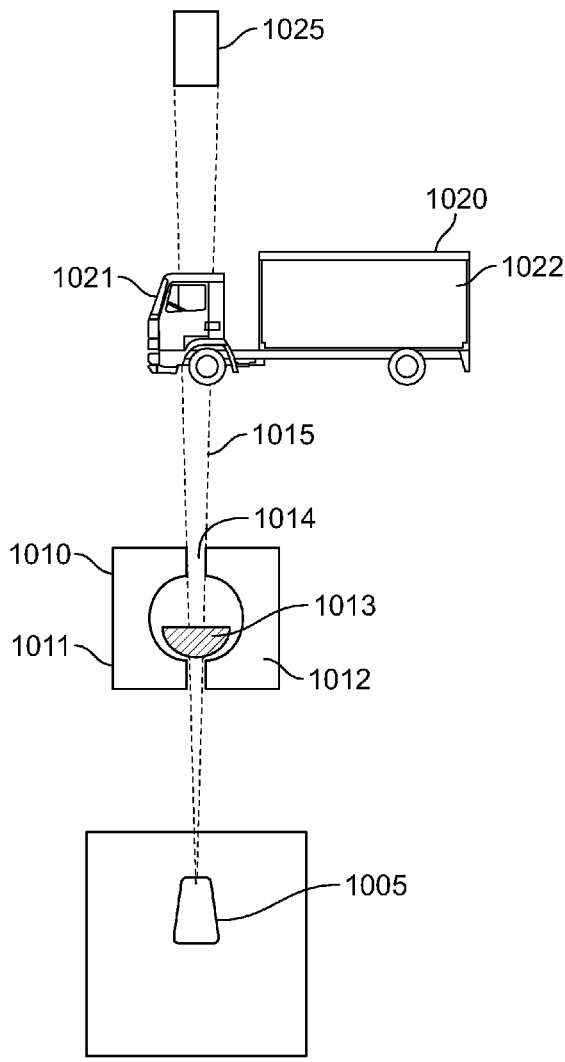
FIG. 10b is a block diagram illustrating another embodiment of the X-ray transmission vehicle screening system of the present specification, having a collimator operating in a low dose rate mode.

FIGS. 10a and 10b are block diagrams illustrating an X-ray transmission vehicle screening system 1000 that employs a novel collimator 1010 in two modes of operation in accordance with one embodiment. Referring to FIGS. 10a and 10b, an X-ray source 1005 (such as a linear accelerator, a betatron or any other high voltage X-ray source known to those of ordinary skill in the art) coupled to the collimator 1010 is used to produce X-ray beams 1015 for transmitting through the vehicle under inspection 1020. At least a portion of the X-ray beams reach data collection module 1025 after penetrating through the vehicle 1020.

The data collection module 1025 comprises at least a detector array, a signal conversion circuit, a data processing circuit and a logic control circuit. The detector array is used to receive the X-ray beam signals transmitting through the inspected vehicle, the received X-ray beam signals are converted into transmission data via the signal conversion circuit, and the transmission data from the signal conversion circuit are combined into projection data by the data processing circuit. Furthermore, synchronous performance of the detector array receiving X-ray beam signals and the data processing circuit transmitting the projection data is controlled by the logic control circuit. Thus, the data collection module 1025 combines the received transmission data into projection data to display resulting radiographic image of the contents of the vehicle 1020 on a monitor, such as an LCD screen for observing by an operator/inspector.

In one embodiment, the inspected vehicle 1020 comprises a cab portion 1021 occupied by a driver and a cargo container portion 1022 that is generally unoccupied by people. The cargo screening system 1000 allows X-ray screening of the cab portion 1021 along with the container portion 1022 as the driver drives the inspected vehicle 1020 past the system 1000, without causing high X-ray dose to the driver occupying the cab portion 1021. This is enabled by use of the novel collimator 1010 of the present invention that modulates the X-ray beam intensity such that the cab portion 1021 receives an acceptable lower X-ray energy dosage as compared to the cargo container portion 1022. However, in one embodiment, if no cargo portion is detected (such as screening a car or bus), the entire scan is conducted at low dose rate.

The collimator 1010, in accordance with one embodiment, comprises first block 1011 and second block 1012 that are fabricated to accommodate an insert 1013 that is, in one embodiment, in a half-cylinder shape. The first and second blocks define opening 1014 to allow X-ray beams to impinge the target 1020 unimpeded. The insert 1013 is rotated to switch the collimator from a high dose rate to a low dose rate operating mode. FIG. 10a shows insert 1013 in the position of high dose rate wherein X-rays are allowed to pass through opening 1014 unhindered for scanning the cargo container portion 1022. FIG. 10b shows insert 1013 in the position of low dose rate wherein the insert is rotated 90 degrees to attenuate X-rays to a suitable dose rate for scanning the cab portion 1021. Thus, the effect of the collimator is to increase the effective energy of the beam when closed compared to the situation when the collimator is open. In one embodiment the low dose rate is in the range of 10% to 0.1% of the full source dose rate, such that the dose delivered to the occupant (such as the driver) of the cab portion 1021 is small enough to meet local and international recommendations (typically in the range 0.1 uSv to 0.25 uSv per scan). The full source dose rate delivered to the cargo portion 1022 ranges from 10 uSv to 100 uSv per scan, in one embodiment. Thus, when the cab portion 1021 is being scanned the insert 1013 is rotated to be in position of FIG. 10b and when the cargo container portion 1022 is being scanned the insert 1013 is kept in position of FIG. 10a.

The blocks 1011, 1012 and insert 1013 are of suitable attenuating material such as, for example, lead for the blocks 1011, 1012 and steel for the insert 1013. The cross-sectional radius 'r' of insert 1013 is sufficiently smaller than the cross-sectional internal radius 'R' of either block to a) enable rotation of the insert 1013 without friction or bracing with the inner walls of the blocks and b) not obstruct X-rays passing through opening 1014 while being in the high dose position of FIG. 10a for scanning the container portion 1022.

FIGS. 11a and 11b show collimator 1110 and insert 1113 in accordance with another embodiment of the present invention. In this embodiment the insert 1113 comprises a cylinder with a slot 1112 machined out along its diameter 1107, thus forming two half-cylinders. The width of the slot 1112 is selected to be wider than the normal collimator opening 1114 so that the insert does not interfere with the passing X-rays when operating in high dose rate mode. When rotated, such as through an angle of 90 degrees in one embodiment, the insert 1113 affects the entire X-ray beam with similar magnitude. The net effect of the collimator is to increase the effective energy of the beam when closed compared with when the collimator is open. The design of collimator 1110 enables rapid switching from low to high dose rate mode which is advantageous in applications such as high speed drive through portals.

Persons of ordinary skill in the art would understand that the effect of the insert, when in the position of obstructing the passing X-rays, is to harden the X-rays and that beam hardening is the process of selective removal of soft X-rays from the X-ray beam. As these X-rays are removed, the beam becomes progressively harder or more penetrating. This beam hardening effect is evident when FIG. 12a, which shows the X-ray spectrum 1205 typically emitted from an X-ray linear accelerator with equivalent operating energy of 1 MV, is compared with FIG. 12b that shows the filtered spectrum 1210 (as a result of obstruction by insert 1013 of FIG. 10b) having a mean higher energy with lower intensity and hence also a lower instantaneous dose rate. An attribute of this hardened or filtered beam is to still achieve high materials penetration (due to the effective high energy of the low intensity beam) without exceeding recommended dose rate for people. It should also be appreciated that if no cargo is detected (such as screening a car or bus), the entire scan is conducted at low dose rate.

Figure 13:
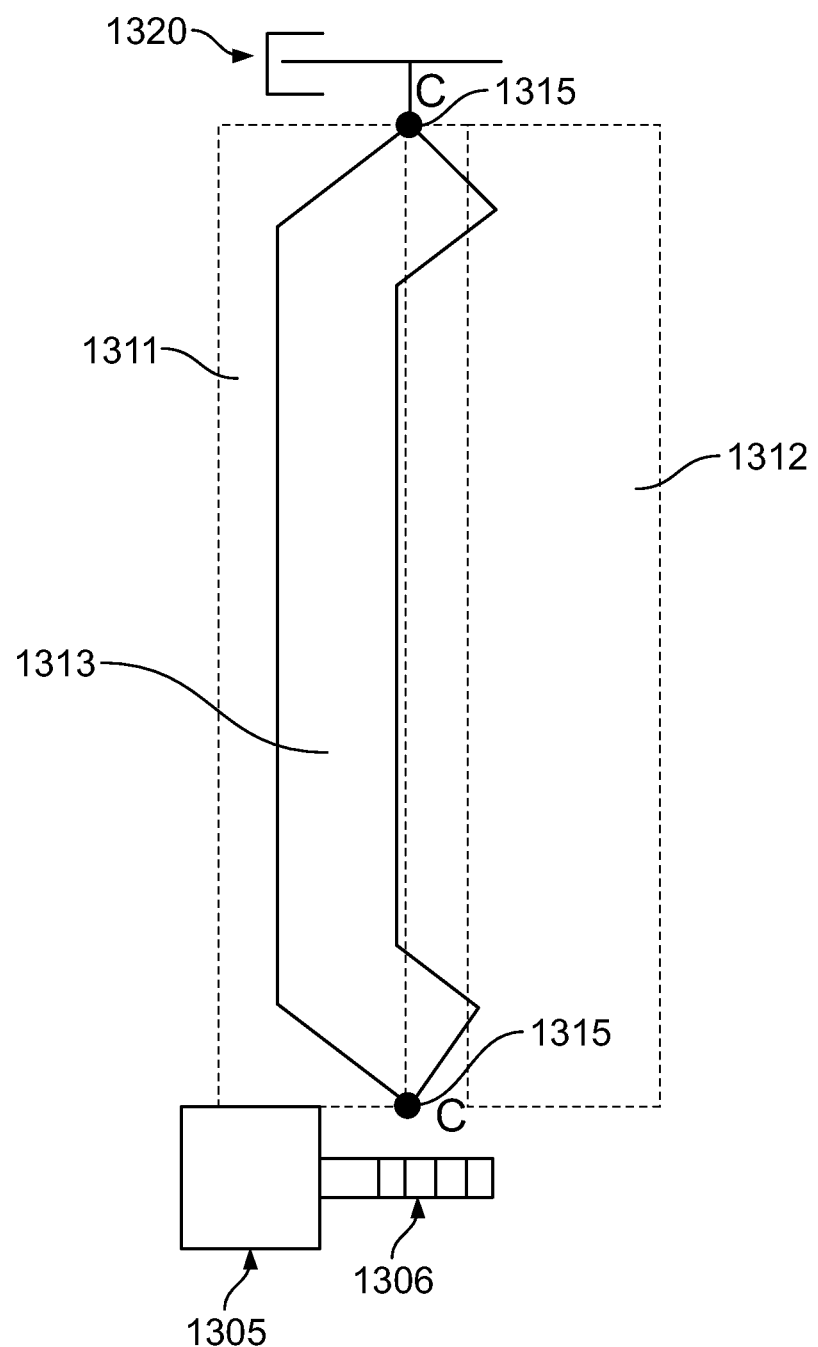
FIG. 13 illustrates an exemplary mechanism for rotating a collimator insert to switch the collimator of the present invention between low and high dose rate operating modes.

FIG. 13 illustrates an exemplary mechanism for rotating the collimator insert to switch the collimator between low and high dose rate operating modes. Referring to FIG. 13, an electric motor 1305 drives a worm gear mechanism 1306 with a cog fixed to the base of the collimator insert 1313. As the motor spins, the collimator insert 1313 is also turned, with the ratio between motor rotation and collimator rotation being governed by the ratio of the worm gear—cog mechanism. The insert 1313 is supported by bearings 1315 at the top and bottom with one or more sensors being used to determine the collimator angle 1320. The insert 1313 and its associated mechanism are connected to one of the two collimator blocks.

Figure 14:
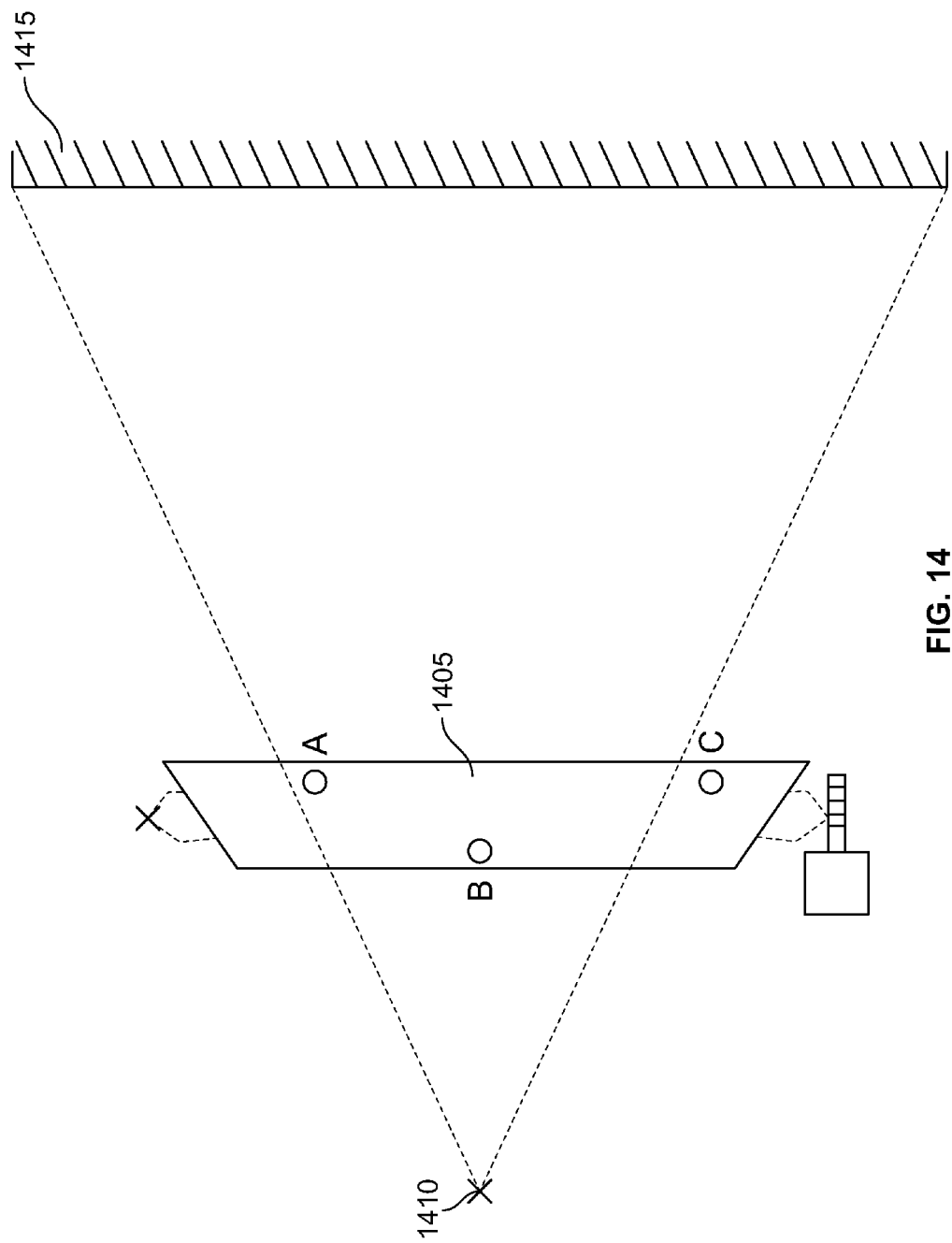
FIG. 14 depicts a three-point mechanism for enabling the collimator of the present invention to be positioned accurately with respect to both the X-ray source and the X-ray detector arrays.

In one embodiment, insert 1313 is connected to first block 1311, with the second collimator block 1312 free to move with respect to the first, for example, using a three point mechanism as shown in FIG. 14. FIG. 14 shows three adjustment points A, B and C which together allow the collimator jaw 1405 to be positioned accurately with respect to both the X-ray source 1410 and the X-ray detector array 1415. In one embodiment, each collimator jaw is advantageously provided with similar adjustment mechanisms. The mechanism of FIG. 13 allows the collimator insert 1313 to be rotated freely about collimator angle 1320 thereby providing an opportunity to vary the dose reduction factor as the rotation angle of the collimator insert 1313 is changed.

Figure 15:
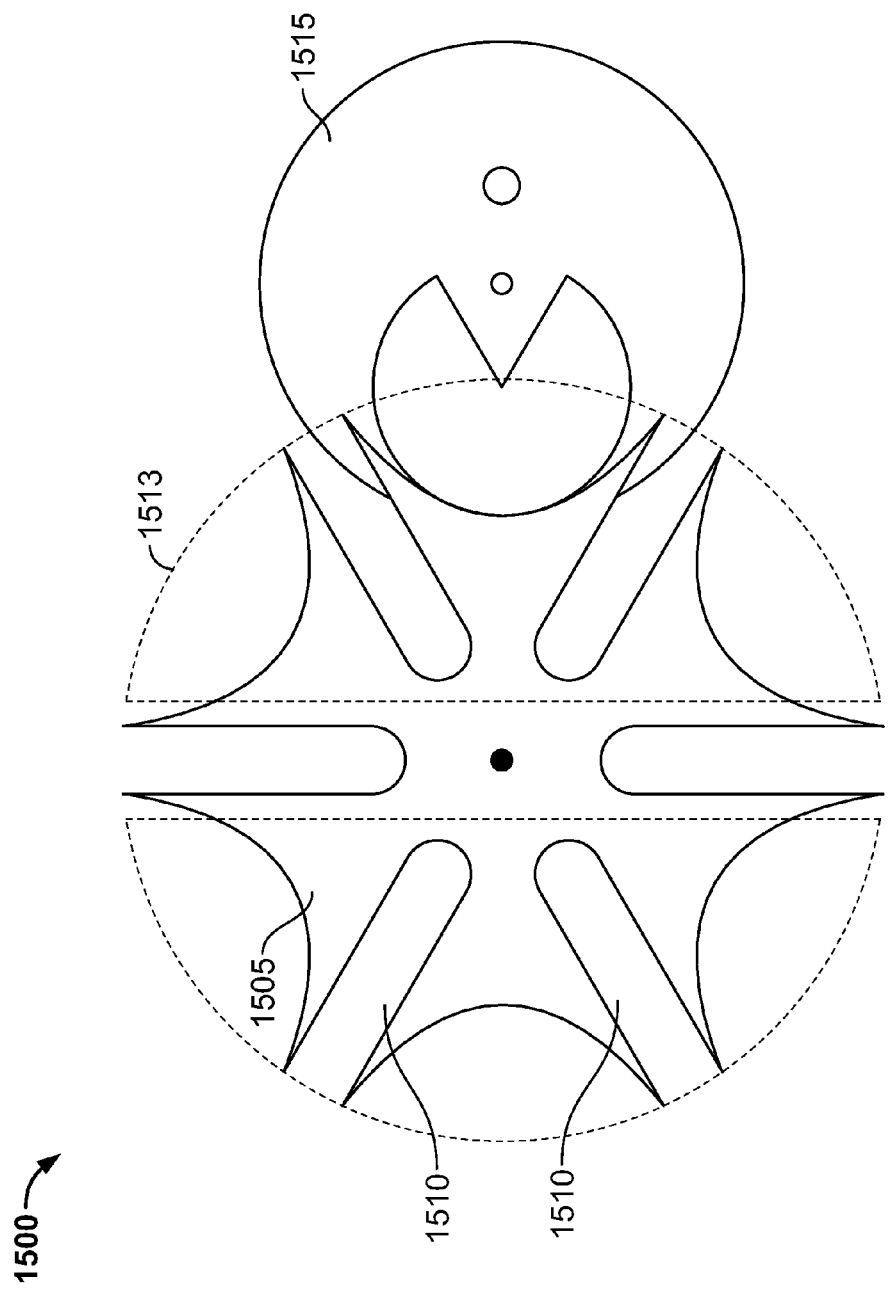
FIG. 15 is an illustration of an exemplary collimator insert rotation mechanism.

However, in an alternative mechanism, collimator insert rotation may be fixed and defined to ensure that the same dose reduction factor is achieved every time that the insert is rotated. In one embodiment of the present invention, fixed and defined incremental rotation is achieved using the Geneva mechanism 1500, shown in FIG. 15. In mechanism 1500, the 'Maltese cross' 1505 is attached to the collimator insert 1513 with crank 1515 being driven by a motor. As the crank 1515 rotates, the insert 1513 remains static until the crank engages in one of the slots 1510 in the cross 1505. As the crank 1515 continues to rotate, the Geneva mechanism 1500 rotates by one increment to set the insert 1513 at its next angle. In one embodiment, a four-fold Geneva mechanism is used with the collimator insert 1513 such that two positions correspond to high dose rate and another two positions correspond to low dose rate operating mode with 90 degree rotation between the alternate dose rate settings. The mechanism 1500 provides very rapid switching between dose rate modes even with modest rotation speeds on the motor. For example, with a drive through speed of 5 km/h (1.4 m/s) it is advantageous to be able to switch dose rates in a 10 cm vehicle length. This requires a switching time of 0.07 sec. Such a fast switching time can be achieved using the Geneva mechanism with a motor rotation speed of 300 RPM and a 1:1 gear wheel mechanism, in one embodiment.

Preferably, the systems disclosed herein achieve a dose switching time of less than 1 second, 0.5 seconds, 0.1 second, and 0.07 seconds.

It should be appreciated that the present application is directed toward a collimator with any member, structure, component or other insert therein, the position of which may be modulated to effect the degree and amount of X-rays emitted through the collimator.

Great Britain Provisional Patent Application Number 0803642.8, entitled "Low Dose Inspection" and filed on Feb. 28, 2008; Patent Cooperation Treaty Application PCT/GB2009/000515, entitled "Drive Through Scanning Systems" and filed on Feb. 26, 2009; and U.S. patent application Ser. No. 12/919,482, entitled "Drive-Through Scanning Systems", and filed on Aug. 26, 2010, which is a National Stage Entry of PCT/GB2009/000515 are all herein incorporated by reference in their entirety and describe an exemplary system in which the collimator of the present invention may be employed. More specifically, the applications describe "[a] drive-through scanning system comprises a radiation generating means arranged to generate radiation at two different energy levels and direct it towards a scanning volume, detection means arranged to detect the radiation after it has passed through the scanning volume, and control means arranged to identify a part of a vehicle within the scanning volume, to allocate the part of the vehicle to one of a plurality of categories, and to control the radiation generating means and to select one or more of the energy levels depending on the category to which the part of the vehicle is allocated."

Figures 16A, 16B, 16C, 16D:
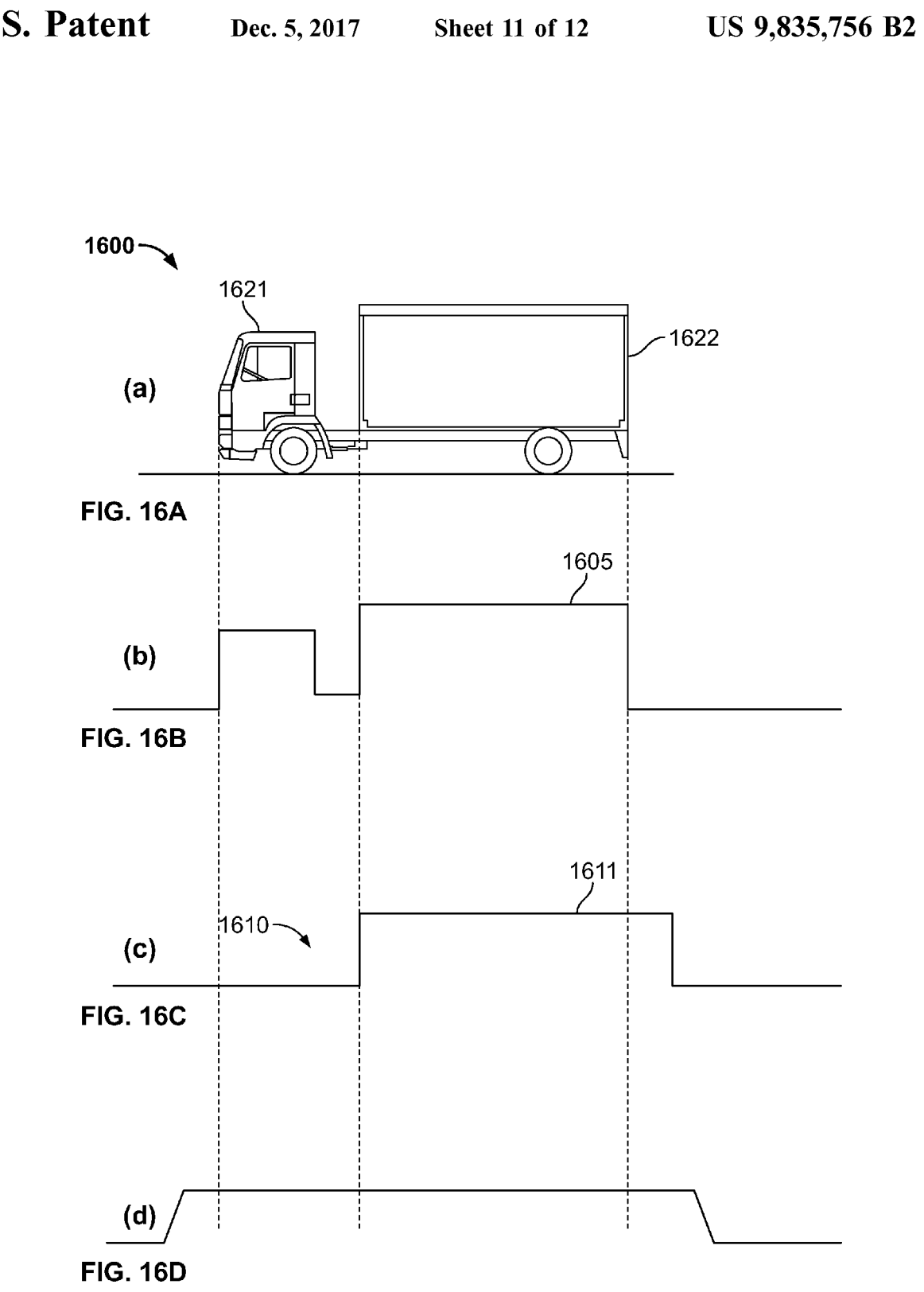
FIG. 16a is an illustration of a cargo vehicle passing through a scanning region/facility.
FIG. 16b depicts a time domain diagram of the height of the vehicle under inspection as it passes through the scanning region/facility.
FIG. 16c illustrates a time domain diagram depicting switching between low dose rate to high dose rate mode of operation depending upon whether the cab portion or the cargo portion of the inspected vehicle is to be scanned.
FIG. 16d illustrates the points in time when the X-ray source is switched on and off.

FIG. 16a shows a cargo vehicle 1600 under inspection and passing through a scanning region/facility with the cab portion 1621 followed by the cargo container portion 1622. FIG. 16b shows the time domain diagram 1605 of the height of the vehicle 1600 as it passes through the scanning region/facility. FIG. 16c illustrates that as the leading edge of the cab portion 1621 is detected the insert of the collimator of the present invention is positioned to operate in low dose mode 1610. Thereafter, it is switched to high dose mode 1611 as the leading edge of the cargo container portion 1622 is detected by, for example, optical sensors. As shown in FIG. 16d, the X-ray source is switched on just before the leading edge of the cab 1621 reaches the X-ray beam (to allow low dose rate calibration data to be collected) and switches off just after the trailing edge of the cargo 1622 has been detected (to allow high dose rate calibration data to be collected). Also, as would be evident to persons of ordinary skill in the art, an electrical control system is responsible for switching the X-ray source on and off and for rotating the collimator insert at the appropriate time given input from a plurality of sensors.

Accordingly, the present invention employs a plurality of sensors to detect transition of the cab and cargo container portions of the inspected vehicle through a scanning region as the vehicle passes through a scanning facility. FIGS. 17a through 17c show a combination of three scanning laser sensor systems used to track the inspected vehicle in accordance with an embodiment of the present invention. FIG. 17a shows a scanning range finder laser 1705 inclined at typically 30 to 60 degrees to the plane of the road surface 1710 such that it measures the position of the inspected vehicle 1715 along entrance to the scanning facility, through the scanning region and out to the exit end of the scanning facility. The laser 1705 is used to detect presence of the vehicle 1715 in the entrance region (to allow the X-ray beam to be prepared for switch on) and then to detect the presence of the vehicle 1715 in the scanning zone to suggest that the X-ray beam should be turned on. The laser 1705 can also be provided with a feature detection algorithm to allow tracking of vehicle speed as it both enters and passes through the scanning facility. For example, the system detects the leading edge of the approaching vehicle by detecting a difference greater than a multiple of the noise threshold between the present and previous frames of laser data. As this leading edge moves towards the center of the scanning zone, it is possible to calculate vehicle speed as (distance travelled)/(time to travel that distance). The laser has a constant rotation rate (for example, 50 scans/second), and so a continuous update on vehicle speed can be determined to account for variation in vehicle speed as it moves through the laser beam. In one embodiment, more advanced algorithms are used to track both the leading and trailing edge of the vehicle. One of ordinary skill in the art would appreciate that still more sophisticated algorithms may be used to track an increasing number of features, such as the end of cab, start of load and so on.

FIG. 17b shows a scanning laser 1706 oriented perpendicular to the direction of motion of the vehicle 1715 in a vertical plane perpendicular to the road surface 1710. Laser 1706 is used to detect the shape of the vehicle 1715, in particular the start of the cab 1716, the end of the cab, the start of the cargo 1717 and the end of the cargo.

FIG. 17c shows a scanning laser 1707 oriented in a vertical plane projecting towards the side of the vehicle 1715. This laser 1707 is also used to detect the start of the cab 1716, the end of the cab, the start of cargo 1717 and the end of the cargo. By combining the signals from laser orientations of FIGS. 17a, 17b and 17c it is possible to avoid unexpected high dose rate exposure of the cab 1716 due to the presence of, for example, a sun roof in the cab. This configuration also enables correct exposure of vehicles with overhanging cargo, such as an ore truck. Alternate sensors, such as IR light curtains, inductive sensors or any other sensors advantageously evident to those of ordinary skill in the art may be used either in place of or in parallel with the sensors described with reference to FIGS. 17a through 17c.

In an additional embodiment, the system may be switched to operate in low dose or high dose rates manually, i.e. using a low dose activation switch or high dose activation switch. The system may also include operational modes, such as "Passenger Vehicle" or "Cargo Vehicle with Detached Cab" or "Cargo Vehicle with Integral Cab", which, if activated by an operator, provides the system with an indication of what kind of vehicle is being inspected and, therefore, what kind of dose rate or sensor trigger to use. For example, if the Passenger Vehicle mode is selected, then the system may operate at a low dose rate and not rely on any sensing system to determine the type of dose rate to use or timing thereof. Conversely, if Cargo Vehicle with Detached Cab mode is selected, then the system may automatically initially operate at a low dose rate and rely on a sensing system to simply indicate when to switch to a high dose rate.

The X-ray transmission vehicle inspection system deploying the dual mode novel collimator of the present invention can be used in a plurality of system configurations. For example, the system may be used as a trailer mounted X-ray system whereby the trailer is towed to the operating site, a detector boom is deployed and the system is operated in Portal mode. In this situation it is advantageous to use a low power (0.01 to 0.1 Gy/min), low energy (0.8 MV to 2 MV) linear accelerator source in order to minimize the size of the radiation exclusion zone. In an alternate configuration, the system may be fitted to a compact mobile scanner which can be driven to site prior to deploying a detector boom. The scanner can then be operated in drive through Portal mode with the drivers' cab being scanned at low dose and the cargo at high dose. In a still alternate configuration, the system may be fitted to a fixed site Portal system which is used for routine scanning of a variety of vehicles from cars and buses to full size trucks carrying cargo.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A method for scanning a vehicle comprising a first portion carrying at least one living being and comprising a second portion carrying cargo, the method comprising:
    generating X-ray beams;
    detecting the generated X-ray beams transmitted through the vehicle;
    modulating an intensity of the X-ray beams by producing low-energy X-ray beams for scanning the first portion carrying the at least one living being and producing high-energy X-ray beams for scanning the second portion carrying the cargo.

2. The method of claim 1 further comprising sensing whether the first portion of the vehicle or second portion of the vehicle is being scanned.

3. The method of claim 2, comprising, based on the sensing, rotating an insert located within an opening of a collimator.

4. The method of claim 3, comprising electrically controlling the rotation of the collimator insert.

5. The method of claim 4, comprising modulating the intensity of the X-ray beams in proportion to an angle of rotation of the insert.

6. The method of claim 1, wherein an intensity of the low energy X-ray beams are in a range of 10% to 0.1% of an intensity of the high energy X-ray beams.

7. A method for scanning a vehicle, comprising:
    generating X-ray beams;
    detecting the generated X-ray beams transmitted through the vehicle;
    modulating an intensity of the X-ray beams by producing low-energy X-ray beams or high-energy X-ray beams, based on a portion of the vehicle being scanned, wherein said low-energy X-ray beams are produced while scanning a portion of the vehicle carrying at least one living being.

8. The method of claim 7 further comprising sensing which portion of the vehicle is being scanned.

9. The method of claim 8, comprising sensing no portion of the vehicle carrying cargo and producing the low-energy X-ray beams for all portions of the vehicle.

10. The method of claim 7, wherein an intensity of the low energy X-ray beams are in a range of 10% to 0.1% of an intensity of the high energy X-ray beams.

11. The method of claim 7, comprising producing high-energy X-ray beams for the portion of the vehicle carrying cargo.

* * * * *